United States Patent [19]

Bacskai

[11] 4,192,939

[45] Mar. 11, 1980

[54] PHOSPHONIUM CATALYST SYSTEM FOR THE POLYMERIZATION OF 2-PYRROLIDONE

[75] Inventor: Robert Bacskai, Kensington, Calif.

[73] Assignee: Chevron Research Company, San Francisco, Calif.

[21] Appl. No.: 903,419

[22] Filed: May 8, 1978

Related U.S. Application Data

[62] Division of Ser. No. 724,802, Sep. 20, 1976, Pat. No. 4,100,146.

[51] Int. Cl.$^2$ ............................................. C08G 69/20
[52] U.S. Cl. .................................. 528/313; 528/312; 528/326
[58] Field of Search ............................... 528/313, 326

[56] References Cited

U.S. PATENT DOCUMENTS

| | | | |
|---|---|---|---|
| 3,721,652 | 3/1973 | Barnes | 528/326 |
| 4,100,146 | 7/1978 | Bacskai | 528/313 |

*Primary Examiner*—Harold D. Anderson
*Attorney, Agent, or Firm*—D. A. Newell; T. G. DeJonghe; Lawrence S. Squires

[57] ABSTRACT

The process of making a catalyst for the polymerization of 2-pyrrolidone by contacting a phosphonium halide, an alkali metal pyrrolidonate and carbon dioxide in a mol ratio of about 1:0.1–2:0.1–0.5 and the polymerization of 2-pyrrolidone with said catalyst. The alkali metal pyrrolidonate may be prepared by reacting an alkali metal hydroxide with 2-pyrrolidone. The polymerization of 2-pyrrolidone in the presence of ths catalyst system produces poly-2-pyrrolidone of high molecular weight.

2 Claims, No Drawings

PHOSPHONIUM CATALYST SYSTEM FOR THE POLYMERIZATION OF 2-PYRROLIDONE

This is a division of application Ser. No. 724,802, filed Sept. 20, 1976, now U.S. Pat. No. 4,100,146.

BACKGROUND OF THE INVENTION

Poly-2-pyrrolidone is produced by the alkaline-catalyzed polymerization of 2-pyrrolidone. The catalyst system may comprise a partially carbonated pyrrolidonate salt made, for example, by reacting an alkali metal hydroxide with 2-pyrrolidone, or by reacting a quaternary ammonium hydroxide with 2-pyrrolidone, dehydrating, and contacting the product with carbon dioxide (U.S. Pat. No. 3,721,652). Japanese Patent No. 47-26195 discloses a process for making a catalyst by reacting a non-water-forming alkali metal compound with 2-pyrrolidone and contacting the product with a quaternary ammonium halide under anhydrous conditions.

BRIEF SUMMARY OF THE INVENTION

A catalyst capable of producing a high-molecular-weight poly-2-pyrrolidone is made by contacting certain phosphonium halides, an alkali metal pyrrolidonate and carbon dioxide in the mol ratio of 1:0.1–2:0.1–0.5.

DESCRIPTION OF PREFERRED EMBODIMENTS

The catalyst of the present invention is capable of producing poly-2-pyrrolidone having a weight average molecular weight in excess of 600,000. The catalyst does not require an anhydrous source of alkali metal pyrrolidonate. The pyrrolidonate may be made by contacting an alkali metal hydroxide with 2-pyrrolidone, rather than by contacting it with an alkali metal or alkali metal alkoxide.

Catalyst System

In the process of the present invention a catalyst for the polymerization of 2-pyrrolidone is made by contacting an alkali metal pyrrolidonate, certain phosphonium halides and carbon dioxide in mol ratio of about 1:0.1–2:0.1–0.5, preferably in mol ratio of about 1:0.2–1.5:0.1–0.5, and most preferably in a mol ratio of about 1:1:0.3.

The reactants, the pyrrolidonate, the halide and carbon dioxide, may be contacted in any order beginning with pyrrolidonate as one of the components. It is preferred, but not necessary, to add the alkyl phosphonium halide to the previously carbonated pyrrolidonate salt. In a preferred embodiment, the catalyst of the present invention is formed in a solution of 2-pyrrolidone. An alkali metal hydroxide is added to an excess of 2-pyrrolidone, with which it reacts to produce a solution of the alkali metal pyrrolidonate and water in 2-pyrrolidone. The solution is dehydrated until it contains less than about 0.1–0.2 weight percent water. Then carbon dioxide is added in the required mol ratio to the pyrrolidonate in the solution at a temperature of about 25° C. The phosphonium halide is also added in the required mol ratio to the pyrrolidonate at a temperature of about 25° C.

The phosphonium halide is a compound of the formula

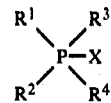

wherein X is a halide, preferably chloride, bromide or iodide, and $R^1$–$R^4$ may be the same or different hydrocarbyl groups, preferably alkyl groups.

The phosphonium halide is preferably a tetraalkyl phosphonium halide, although alkylaryl phosphonium halide, such as phenyl trimethyl phosphonium halide and benzyl triethyl phosphonium halide, may be included. The tetraalkyl phosphonium halide is preferably a tetra ($C_1$–$C_6$) alkyl phosphonium halide, and most preferably a tetra ($C_1$–$C_4$) alkyl phosphonium halide. The alkyl groups in tetraalkyl phosphonium halide may be the same or different. The tetraalkyl phosphonium halide is preferably a chloride, bromide or iodide, most preferably a bromide. The phosphonium halide may be used as a combination of species, e.g., as a mixture of tetramethyl phosphonium chloride and tetraethyl phosphonium bromide. The phosphonium halide should be substantially soluble under the alkaline conditions of catalyst system preparation and polymerization in order to show an appreciable effect on the polymerization reaction.

The alkali metal pyrrolidonate is preferably sodium or potassium pyrrolidonate. For certain purposes, it may be advantageous to substitute for pyrrolidonate in whole or in part an alkali metal caprolactamate or the alkali metal salt of another low-molecular-weight lactam, but this is normally not preferred to the use of the pyrrolidonate. The alkali metal pyrrolidonate is preferably made by contacting the alkali metal hydroxide with excess 2-pyrrolidone, but other methods may be chosen, such as by reacting 2-pyrrolidone with an alkali metal or an alkali metal alkoxide. While it is preferable to contact the phosphonium halide, the pyrrolidonate and carbon dioxide in a 2-pyrrolidone solution, inert solvents may be used in whole or in part to replace the 2-pyrrolidone. Sulfur dioxide is believed to be an inferior substitute for carbon dioxide, but its use is not barred in the practice of the present invention.

In the catalyst system of the present invention, polymerization initiators and polymerization accelerators may also be used. Unexpectedly rapid polymerization to poly-2-pyrrolidone of satisfactorily high molecular weight is achieved in this catalyst system by the addition of 0.05–1.5 mol percent of an N-acyl lactamate accelerator such as that which is believed to be produced by the reaction between 2-pyrrolidone or caprolactam and acetic acid anhydride. Preferably 0.05–0.5 and most preferably about 0.1–0.2 mol percent of an N-acyl pyrrolidone is used. The preferred N-acyl pyrrolidone is N-acetyl pyrrolidone.

Polymerization Conditions

The polymerization process of this invention is specifically applicable to the polymerization of 2-pyrrolidone to form a polymeric carbonamide of high molecular weight in a reasonable polymerization time of 8–24 hours. Weight average molecular weights in excess of 600,000 have been attained. The high-molecular-weight polymer is capable of being formed into filaments having substantial orientation along the filamentary axis, high tensile strength and other properties suitable for making into textiles. It can be made into shaped articles and film by melt-molding or extrusion.

In order to produce high-quality poly-2-pyrrolidone capable of being formed into fibers, filaments and yarn of commercial textile quality, it is necessary that the 2-pyrrolidone monomer be of high purity. Depending upon the process of manufacture, commercially available 2-pyrrolidone may contain appreciable amounts of various impurities, some of which are believed to interfere deleteriously with polymerization. Purification of the monomer to polymerization grade is achieved by known purification techniques, including distillation.

The process of the present invention is just as applicable to the production of polymers of C-alkyl-substituted pyrrolidone, such as 4-methyl-2-pyrrolidone and copolymers of 2-pyrrolidone, such as with caprolactum, as to the production of poly-2-pyrrolidone.

Preferably the catalyst system comprises about 0.5–30 mol percent or more of the 2-pyrrolidone-catalyst mixture, based on total 2-pyrrolidone, preferably about 5–20 mol percent, and most preferably about 10 mol percent catalyst. Total 2-pyrrolidone consists of 2-pyrrolidonate catalyst, including alkali metal pyrrolidonate and phosphonium pyrrolidonate, as well as carbonated alkali metal pyrrolidonate and carbonated phosphonium pyrrolidonate, and 2-pyrrolidone provided as solvent to said catalyst, and any additional monomer charged to the mixture for polymerization reaction. The polymerization catalyst system is believed to comprise principally phosphonium pyrrolidonate and carbonated phosphonium pyrrolidonate, but substantial amounts of alkali metal pyrrolidonate and carbonated alkali metal pyrrolidonate (carboxypyrrolidonate) may also be present, depending upon the mol ratios chosen. Alkali metal halide is known to be present, but it is believed to be inert towards the polymerization reaction. Polymerization initiators or activators, such as N-acyl derivatives of the lactams, or compounds forming N-acyl derivatives of 2-pyrrolidone, may also be added to the catalyst system as an aid to polymerization.

In general, 2-pyrrolidone may be polymerized at a temperature from about 15° C. to about 100° C., preferably 25° C. to 70° C., and most preferably from about 40° C. to about 60° C., under a pressure ranging from subatmospheric to superatmospheric, in the presence of the catalyst system for a period from about 4 to about 100 hours or longer, preferably for about 8 to about 72, hours, and most preferably from about 8 to about 48 hours. In continuous operation, polymerization time refers to average residence under polymerization conditions. A small amount of water, not exceeding about 0.1–0.2 weight percent, based on total 2-pyrrolidone, is permissible in the reaction mixture, but less than 0.1 weight percent is preferred.

Preparation of polymers of 2-pyrrolidone, according to the normal process of this invention, can be carried out with various amounts of monomers, catalyst, inert nonsolvent liquids, initiators and other additives—the amount of each being properly coordinated to produce the most effective polymerization. Although the preferred amounts of the components in the reaction have been given, it is understood that these are not intended to be limitations to polymerization, since it may be possible to achieve substantial polymerization outside the preferred ranges.

TABLE

| % $R^1R^2R^3R^4PX^1$ | % Conversion[2] | Mw × 10$^{-3}$ |
|---|---|---|
| $(C_4H_9)_4PBr$ | 45.3 | 635 |
| $(C_4H_9)_4PCl$ | 18.8 | 100 |

[1] Mol ratio of potassium to phosphonium halide about 2.
[2] 5 mol percent KOH-derived potassium pyrrolidonate (30 mol % $CO_2$ added). Polymerized 22 hours at 50° C.

The table is illustrative of the polymerization of 2-pyrrolidone obtainable from the phosphonium halide catalyst systems of the present invention. Catalyst preparation and polymerization were performed or described above. Other than carbon dioxide, no polymerization activations or initiators were used. Polymerizations using other onium salts, performed under substantially the same conditions as those described in the table, show that the phosphonium halides are among the few onium salts which can be successfully employed to provide satisfactory catalyst systems for 2-pyrrolidone polymerization. For example, attempts to utilize $(CH_3)_3HNCl$, $(C_6H_5)_3CPF_6$, $(CH_3)_3OPF_6$, and $C_6H_5N_2PF_6$, as substitutes for the phosphonium halides of the table, failed to produce appreciable polymerization of 2-pyrrolidone.

What is claimed is:

1. The process of polymerizing a 2-pyrrolidone composition by contacting an alkali metal pyrrolidonate, a tetraalkyl phosphonium halide and carbon dioxide in a mol ratio 1:0.1–2:0.1–0.5, respectively, and additionally 0.01–0.5 mol percent of N-acyl pyrrolidone or N-acylcaprolactam or acetic anhydride, with 2-pyrrolidone monomer to yield a poly- 2-pyrrolidone polymer capable of being formed into filaments, films, or shaped articles.

2. The process according to claim 1 wherein said N-acyl pyrrolidone is N-acetyl pyrrolidone.

* * * * *